(12) United States Patent
Morera et al.

(10) Patent No.: US 8,611,280 B2
(45) Date of Patent: Dec. 17, 2013

(54) PUBLIC LAND MOBILE NETWORK SELECTION PROCEDURES FOR SIMULTANEOUS NETWORK CONNECTIVITY THROUGH MULTIPLE ACCESSES

(75) Inventors: Raquel Morera, Weehawken, NJ (US); Subir Das, Belle Mead, NJ (US); Yoshihiro Ohba, Kawasaki (JP)

(73) Assignees: Telcordia Technologies, Inc., Piscataway, NJ (US); Kabushiki Kaisha Toshiba, Tokyo (JP)

( * ) Notice: Subject to any disclaimer, the term of this patent is extended or adjusted under 35 U.S.C. 154(b) by 231 days.

(21) Appl. No.: 13/005,764

(22) Filed: Jan. 13, 2011

(65) Prior Publication Data

US 2012/0020204 A1     Jan. 26, 2012

Related U.S. Application Data

(60) Provisional application No. 61/294,859, filed on Jan. 14, 2010.

(51) Int. Cl.
*H04Q 7/00* (2006.01)
(52) U.S. Cl.
USPC .......................................... 370/328; 370/329
(58) Field of Classification Search
USPC ................. 370/328, 329, 331, 332, 333, 334; 455/432.1, 435.1, 435.2, 435.3, 432.2, 455/436, 437, 438, 439, 440, 441–444
See application file for complete search history.

(56) References Cited

U.S. PATENT DOCUMENTS

| | | | |
|---|---|---|---|
| 6,961,569 B2 | 11/2005 | Raghuram et al. | |
| 8,036,654 B2 * | 10/2011 | Hind et al. | 455/432.1 |
| 8,045,980 B2 * | 10/2011 | Buckley et al. | 455/434 |
| 2004/0242199 A1 | 12/2004 | Edlund et al. | |
| 2005/0090255 A1 | 4/2005 | Kuchibhotla et al. | |
| 2006/0094427 A1 * | 5/2006 | Buckley et al. | 455/434 |
| 2006/0095954 A1 * | 5/2006 | Buckley et al. | 726/2 |
| 2006/0187892 A1 | 8/2006 | Zhang | |
| 2007/0191006 A1 | 8/2007 | Carpenter | |
| 2008/0020761 A1 | 1/2008 | Park | |
| 2008/0153486 A1 | 6/2008 | Ramkull et al. | |
| 2008/0220773 A1 | 9/2008 | Buckley | |
| 2008/0287125 A1 | 11/2008 | Hind et al. | |
| 2012/0058762 A1 * | 3/2012 | Buckley et al. | 455/434 |
| 2013/0178208 A1 * | 7/2013 | Dahlen et al. | 455/435.2 |

OTHER PUBLICATIONS

International Search Report, dated Apr. 6, 2011 (2 pages).

* cited by examiner

*Primary Examiner* — Chuong T Ho
(74) *Attorney, Agent, or Firm* — Philip J. Feig

(57) ABSTRACT

A system and method for network selection procedures for simultaneous network connectivity through multiple accesses comprises obtaining stored and registered PLMNs, determining whether PLMNs are both stored PLMN for access technology type Ai and registered PLMN, when no PLMNs are both, performing PLMN selection using a standard procedure, when only one PLMN is both, determining whether the PLMN satisfies a condition, and when the PLMN satisfies the condition, attempting to connect to the PLMN, and when more than one PLMN is both, creating a set of PLMNs, selecting one PLMN that satisfies the condition, from the set PLMN, attempting to connect to the selected PLMN, and when attempting to connect fails, removing the selected PLMN from the set, and selecting another PLMN. In one aspect, the PLMN that minimizes changes is selected. In one aspect, the PLMN that provides access to a larger number of access technologies is selected.

8 Claims, 6 Drawing Sheets

A method to meet PLMN Selection Requirements for
Simultaneous Access objectives is described as follows:
- Step 1: Let {PLMNi} be the list of PLMNIDs including the last
  registered PLMNID for which there is an entry in the PLMN list
  stored in the SIM/USIM for access technology Ai.
- Step 2: Let {PLMNn} be the list of PLMNIDs containing PLMNIDs the
  UE is currently registered with through different access technology
  types.
- Step 3: Let {PLMNin} be the set of PLMNIDs that results from the
  intersection between {PLMNi} and {PLMNn}
    - Step 3.1: If {PLMNin} is NULL, the UE shall perform PLMN
      selection for access technology Ai as if it were the only
      access technology the UE were capable to connect to (this
      is performed by standard procedures).
    - Step 3.2: If {PLMNin} is NOT NULL
        - Step 3.2.1: The UE shall select a PLMN ID that provide
          connectivity through the largest number of access technology
          types that satisfies a particular condition.
        - Step 3.2.2: If there is more than one PLMNID that satisfy the
          condition, the UE shall first give priority to those PLMNs that are
          already registered with and provide access to the largest number
          of already connected access technology types. Second, it shall
          give priority to the PLMNs that have the highest priority in the
          PLMN list stored in the UE for access technology Ai.
- If the UE tries to connect to the selected PLMNID and it fails, the UE
  shall remove such PLMNID from {PLMNi} and {PLMNn} sets and
  perform again a PLMN selection for simultaneous access with the
  modified set of PLMNIDs

FIGURE 3

Use Case 1.1
- Access Technology Ai=A1
- Information on USIM regarding PLMN
  - PLMN1: A1
  - PLMN2: A1
  - PLMN3: A2, A3, A4
  - PLMN4: A2
  - PLMN5: A3
  - PLMN6: A4
- UE is registered in PLMN3 through A3
- {PLMNi }={PLMN1,PLMN2}
- {PLMNn}={PLMN3}
- {PLMNi}∩{PLMNn}=∅
- Ai will connect to PLMN1

Use Case 1.2
- Access Technology Ai=A1
- Information on USIM regarding PLMN
  - PLMN1: A1
  - PLMN2: A1, A2, A3, A4
  - PLMN3: A2
  - PLMN4: A3
  - PLMN6: A4
- UE is registered in PLMN3 through A2
- {PLMNi }={PLMN1,PLMN2}
- {PLMNn}={PLMN3}
- {PLMNi}∩{PLMNn}= ∅
- Ai will connect to PLMN1

Use Case 1.3
- Access Technology Ai=A1
- Information on USIM regarding PLMN
  - PLMN1: A1, A2
  - PLMN2: A1, A2, A3, A4
  - PLMN3: A2
  - PLMN4: A3
  - PLMN6: A4
- UE is registered in PLMN1 through A2
- {PLMNi }={PLMN1,PLMN2}
- {PLMNn}={PLMN1}
- {PLMNi}∩{PLMNn}={PLMN1}
- Ai will connect to PLMN1

Use Case 1.4
- Access Technology Ai=A1
- Information on USIM regarding PLMN
  - PLMN1: A1, A2
  - PLMN2: A1, A2, A3, A4
  - PLMN3: A2
  - PLMN4: A3
  - PLMN6: A4
- UE is registered in PLMN1 through A2
- UE is registered in PLMN2 through A3
- {PLMNi }={PLMN1,PLMN2}
- {PLMNn }={PLMN1,PLMN2}
- {PLMNi}∩{PLMNn }={PLMN1,PLMN2}
- Ai will connect to PLMN2 because it provides access to a larger number of access technologies

FIGURE 5

Use Case 2.1
- Access Technology Ai=A1
- Information on USIM regarding PLMN
  - PLMN1: A1
  - PLMN2: A1
  - PLMN3: A2, A3, A4
  - PLMN4: A2
  - PLMN5: A3
  - PLMN6: A4
- UE is registered in PLMN3 through A3
- {PLMNi }={PLMN1,PLMN2}
- {PLMNn} ={PLMN3, PLMN5}
- {PLMNi} ∩ {PLMNn}=∅
- Ai will connect to PLMN1

Use Case 2.2
- Access Technology Ai=A1
- Information on USIM regarding PLMN
  - PLMN1: A1
  - PLMN2: A1, A2, A3, A4
  - PLMN3: A2
  - PLMN4: A3
  - PLMN6: A4
- UE is registered in PLMN3 through A2
- {PLMNi }={PLMN1,PLMN2}
- {PLMNn}={PLMN2, PLMN3}
- {PLMNi} ∩ {PLMNn}= ∅
- Ai will connect to PLMN1

Use Case 2.3
- Access Technology Ai=A1
- Information on USIM regarding PLMN
  - PLMN1: A1, A2
  - PLMN2: A1, A2, A3, A4
  - PLMN3: A2
  - PLMN4: A3
  - PLMN6: A4
- UE is registered in PLMN1 through A2
- {PLMNi }={PLMN1,PLMN2}
- {PLMNn}={PLMN1PLMN2, PLMN3}
- {PLMNi} ∩ {PLMNn}={PLMN1,PLMN2}
- Ai will connect to PLMN1 because it is already registered in PLMN1

Use Case 1.4
- Access Technology Ai=A1
- Information on USIM regarding PLMN
  - PLMN1: A1, A2
  - PLMN2: A1, A2, A3, A4
  - PLMN3: A2
  - PLMN4: A3
  - PLMN6: A4
- UE is registered in PLMN1 through A2
- UE is registered in PLMN2 through A3
- {PLMNi }={PLMN1,PLMN2}
- {PLMNn}={PLMN1,PLMN2,PLMN3, PLMN4}
- {PLMNi} ∩ {PLMNn }={PLMN1,PLMN2}
- Ai will connect to PLMN2 because it provides access to a larger number of access technologies

FIGURE 6

PUBLIC LAND MOBILE NETWORK SELECTION PROCEDURES FOR SIMULTANEOUS NETWORK CONNECTIVITY THROUGH MULTIPLE ACCESSES

CROSS REFERENCE TO RELATED APPLICATIONS

This application is related to and claims priority to U.S. Provisional Application Ser. No. 61/294,859 filed on Jan. 14, 2010, the entire contents and disclosure of which is incorporated herein by reference.

FIELD OF THE INVENTION

This invention relates Public Land Mobile Network (PLMN) selection, cellular networks, wireless networks, $3^{rd}$ Generation Partnership Project (3GPP) and Interworking-Wireless Local Area Networks (I-WLAN). The present invention further relates generally to a (PLMN) selection mechanism that allows multi-interface terminals to be simultaneously connected to multiple access technologies with a minimum number of registered PLMNs while maximizing the network connectivity.

BACKGROUND OF THE INVENTION

Terminals perform PLMN selection for each access technology as if it were the only access technology the terminal is capable of connecting to; this selection is not influenced by the fact that the terminal has a multi-interface capability. There are existing standards specifications defining PLMN selection procedures for 3GPP accesses, and TS 22.011 (v. 8.9.0), 3GPP, Technical Specification Group Services and Systems Aspects, Service Accessibility (Release 9) specifies: "As consequence, the multi-mode terminal when entering 3GPP mode of operation shall act as if it were a 3GPP only UE [user equipment] which had just been switched-on. Similarly, when leaving the 3GPP mode of operation the multimode terminal shall act as if it were a 3GPP only UE which had just been switched-off".

Simultaneous connectivity over a 3GPP and a non-3GPP access is supported in current specifications (see TS 23.402 (v.9.3.0) 3GPP Technical Specification Group Services and System Aspects; Architecture enhancements for non-3GPP accesses). PLMN selection for 3GPP and non-3GPP accesses is performed in an independent manner (e.g., PLMN selection for 3GPP access [TS 22.011 (v.9.3.0) 3GPP Technical Specification Group Services and System Aspects; Architecture enhancements for non-3GPP accesses] and PLMN selection of I-WLAN [TS 23.234 (v.9.0.0) 3GPP Technical Specification Group Services and System Aspects; 3GPP system to Wireless Local Area Network (WLAN) interworking; System description and TS 24.234 (v. 8.3.0), 3GPP, Technical Specification Group Core Network and Terminals, 3GPP System to Wireless Local Area Network (WLAN) Interworking; WLAN User Equipment (WLAN UE) to network protocols (Stage 3)]. There is no shared information between PLMN selection procedures for 3GPP and non-3GPP accesses. Instead, the list of preferred PLMNs for 3GPP access is stored separately from the list of preferred PLMNs for non-3GPP access, e.g., in USIM, PLMN record information is stored separately from I-WLAN PLMN records (see TS 23.008 (v.9.1.0) 3GPP Technical Specification Group Core Network and Terminals; Organization of subscriber data). The last registered PLMN for 3GPP access is stored in the SIM/USIM as a different record from the last registered PLMN for I-WLAN (see TS 23.008).

3GPP also standardizes PLMN selection procedures for non-3GPP access for I-WLAN (see TS 22.234, (v. 8.1.0), 3GPP, Technical Specification Group Core Network and Terminals, Requirements on 3GPP System to Wireless Local Area Network Interworking (Release 7) and TS 24.234). Separate from 3GPP accesses, there is no statement saying that PLMN selection procedures for I-WLAN do not depend on the terminal having multi-mode capabilities. The procedures defined, however, do not link PLMN selection procedures for I-WLAN with PLMN selection procedures for 3GPP accesses.

Therefore, with current standards, PLMN selection procedures for I-WLAN and PLMN selection procedures for 3GPP accesses are performed in an independent manner. It is then possible for a multi-mode UE to connect to different PLMNs over different accesses, for example, one for 3GPP access and a different one for non-3GPP accesses. In such scenarios, flow mobility among access networks may be limited due to the fact that network policies can only be applied within an operator's domain.

PLMN selection procedures have been defined independently for each access technology type, so that the PLMN selected on an access technology type cannot influence the PLMN selected on a different access technology type. Simultaneous connectivity over different 3GPP accesses is not supported in current specifications. 3GPP PLMN selection procedures are only defined when the UE is connected to only one 3GPP access at a time. A preferred PLMN list can be access type specific, meaning that the list of preferred PLMNs for access type i may be different from the list of preferred PLMNs for access type j.

However, when the network sends policies to the UE to steer traffic from one access network to another, e.g., Internet offload to WLAN or IP flow mobility, such policies can only take effect among access networks that belong to the same PLMN (or equivalent PLMN). This makes network controlled mobility (or steering of access) between access technologies difficult. In other words, it is not possible for operators to offload traffic from their networks from one access technology type to another, if these types are not connected on the UE to the same operator.

Accordingly, a multi-interface terminal selects PLMN for each access type (each interface may be associated with a different access type) in an independent manner, i.e., the fact that a PLMN has been selected for a particular access type is not taken into account in the PLMN selection of other access types. If the terminal is capable of transmitting simultaneously over multiple interfaces, this independent selection process may result in the terminal being simultaneously connected to multiple PLMNs. In such a case, an operator cannot offload traffic from one access type to another, as operator's policies can only be applied within its own domain (i.e. within the same PLMN). For example, if a terminal is connected to OP1 over 3GPP access and OP2 over WLAN, OP1 cannot offload traffic to WLAN, as this would mean the traffic would be offloaded to a different operator. Traffic offload to alternate access is becoming very important for cellular operators as bandwidth hungry data applications are growing.

Thus a generalized PLMN selection mechanism that considers multiple-interface capability and network policy is needed to better manage the flow mobility. Having generalized procedures of PLMN selection for multi-interface terminals will allow operators to better manage the flows across access networks through network policies.

SUMMARY OF THE INVENTION

An inventive generalized PLMN selection mechanism that allows multi-interface terminals to be simultaneously connected to multiple access technologies with a minimum number of registered PLMNs while maximizing the network connectivity is presented. The novel technique is coordinated with the knowledge of other interfaces and network policies, and generalizes the solution, tries to minimize the number of PLMNs that can be simultaneously connected to and thus allows operators to better manage their traffic over different network types.

A method for network selection procedures for simultaneous network connectivity through multiple accesses is presented. The method comprises steps of obtaining, on a UE having a CPU, stored PLMNs and registered PLMNs, determining whether one or more PLMNs are both a stored PLMN for an access technology type Ai and a registered PLMN, when no PLMNs are both, performing PLMN selection for access technology Ai using a standard procedure, when only one PLMN is both, performing steps of determining whether the one PLMN satisfies a condition, when the one PLMN satisfies the condition, attempting to connect to the one PLMN, and when more than one PLMN is both, performing steps of creating a set of the more than one PLMN, selecting one PLMN of the set of PLMN, said selected one PLMN satisfying the condition, attempting to connect to the selected one PLMN, and when attempting to connect fails, removing the selected one PLMN from the set, and selecting another PLMN from the set.

In one aspect, the stored PLMNs are stored on one of SIM/USIM. In one aspect, selecting further comprises selecting the PLMN that minimizes changes. In one aspect, selecting further comprises selecting the PLMN that provides access to a larger number of access technologies.

A system for network selection procedures for simultaneous network connectivity through multiple accesses comprises a UE having a SIM/USIM having a PLMN selection list, said UE registered to one or more PLMNs, and a module operable to obtain stored PLMNs and registered PLMNs, to determine whether one or more PLMNs are both a stored PLMN for access technology type Ai and a registered PLMN, when no PLMNs are both, to perform PLMN selection for Ai using a standard procedure, when only one PLMN is both, to determine whether the one PLMN satisfies a condition, and when the one PLMN satisfies the condition, to attempt to connect to the one PLMN, and when more than one PLMN is both, to create a set of the more than one PLMN, to select one PLMN of the set of PLMN, said selected one PLMN satisfying the condition, to attempt to connect to the selected one PLMN, and when attempting to connect fails, to remove the selected one PLMN from the set, and select another PLMN from the set.

In one aspect, to select one PLMN of the set of PLMN further comprises selecting the PLMN that minimizes changes. In one aspect, to select one PLMN of the set of PLMN further comprises selecting the PLMN that provides access to a larger number of access technologies.

A computer readable storage medium storing a program of instructions executable by a machine to perform one or more methods described herein also may be provided.

BRIEF DESCRIPTION OF THE DRAWINGS

These and other features, benefits, and advantages of the present invention will become apparent by reference to the following figures, with like reference numbers referring to like structures across the views, wherein:

FIG. 3 illustrates the inventive method.

FIG. 5 shows Use Cases 1.1-1.4.

FIG. 6 shows Use Cases 2.1-2.4.

DETAILED DESCRIPTION

For purposes of the description in this application the following definitions shall apply.

PLMN: Public Land Mobile Network

EPLMN: Equivalent PLMN

I-WLAN: Interworking WLAN

3GPP access: includes access technologies defined by 3GPP, i.e., GSM, UMTS, HSDPA, LTE Non-3GPP access: includes access technologies not defined by 3GPP, e.g., WiFi, WiMax, CDMA2000

UE: user equipment, including but not limited to a multi-mode terminal, a mobile device, etc. User equipment has features including a CPU.

Note that 3GPP has specified PLMN selection procedures for I-WLAN only under the category of non-3GPP access. I-WLAN shall be considered as one access technology for non-3GPP in this application.

A mechanism is presented to coordinate PLMN selection over different access (3GPP and non-3GPP, or different 3GPP accesses) when the UE is simultaneously connected through the different accesses. The number of accesses to which the UE is simultaneously connected is not important. In practice, such number will be limited by interference or UE capabilities. Coordination of PLMN selection among different accesses can be set as a configuration parameter. The home operator or the user can set such configuration parameter.

When a new interface of access technology Ai powers up or it recovers from loss of coverage, the UE shall try to connect to a PLMN that meets the following requirements. The PLMN selection procedure shall be able to use information already stored in the SIM/USIM card related to PLMN selection, i.e., PLMN list per access technology. The PLMN selection procedure shall be able to store and use information about last registered PLMN for access technology type. As discussed above, current 3GPP standards only specify how to store in the SIM/USIM a single last registered PLMN for 3GPP access and I-WLAN last registered PLMN. Using the inventive technology, the UE shall be simultaneously connected to the smallest number possible of PLMNs, while maintaining stability. The number of PLMN re-selections over already connected accesses shall be minimized. Home operator PLMN selection policies shall be taken into account. PLMN selection policies may indicate a list of access technology types for which PLMN re-selection shall not be attempted.

FIG. 3 shows a novel method to meet such objectives.

Figure 4:
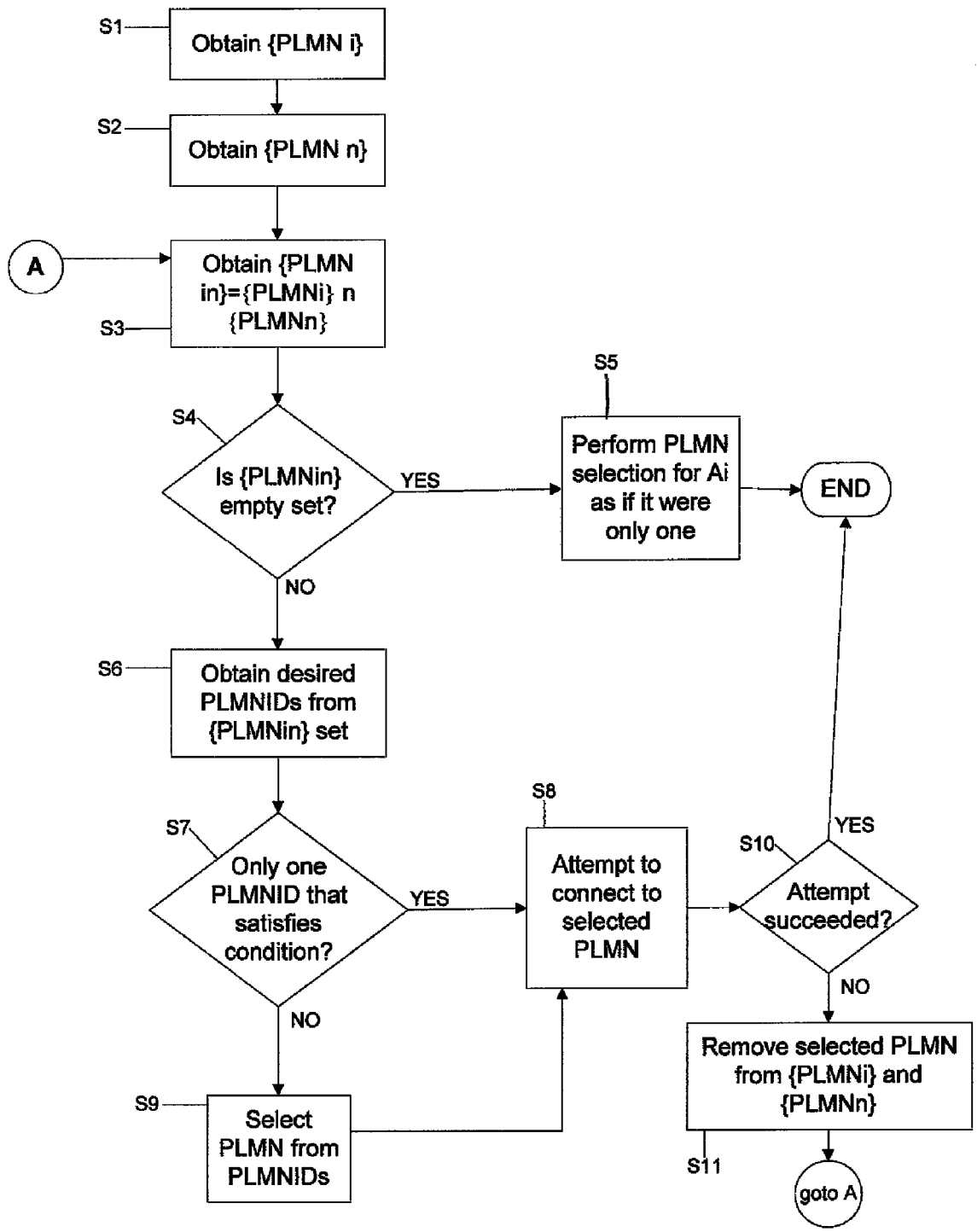
FIG. 4 is a flow diagram of the inventive method.

FIG. 4 is a flow diagram of the inventive method. In step S1, obtain {PLMNi}, that is, obtain a list of PLMNIDs including the last registered PLMNID for which there is an entry in the PLMN list stored in the SIM/USIM for access technology Ai. In step S2, obtain {PLMNn}, that is, a list of PLMNIDs containing PLMNIDs the UE is currently registered with through different access technology types.

In step S3, obtain the set {PLMNin} as the set of PLMNIDs that results from the intersection between {PLMNi} and {PLMNn}. If {PLMNin} is the empty set (S4=YES), in step S5, the UE shall perform PLMN selection for access technology Ai as if it were the only access technology the UE were capable to connect to; this is performed by standard procedures. After step S5, the process ends.

Otherwise, if {PLMNin} is NOT NULL (S4=NO), in step S6 the UE shall obtain desired PLMNIDs from the {PLMNin} set obtained in step S3. These desired PLMNIDs are selected PLMNIDs that provide connectivity through the largest number of access technology types that satisfy a particular condition. This condition could be empty, for example, select a PLMNID that provides connectivity to the largest number of access technology types with no condition. Alternatively, the operator could add a condition related to location, for example, select a PLMNID that provides connectivity to the largest number of access technology types and it is allowed to connect at a particular location.

If there is only one PLMNID that satisfies this particular condition (S7=YES), then, in step S8, this PLMNID is selected and the UE attempts to connect to the PLMN of this selected PLMNID.

Otherwise, if there is more than one PLMNID that satisfies the condition (S7=NO), in step S9, one PLMNID is selected as follows. The UE shall first give priority to those PLMNs that are already registered with and provide access to the largest number of already connected access technology types. Second, it shall give priority to the PLMNs that have the highest priority in the PLMN list stored in the UE for access technology Ai.

After one PLMNID is selected, if the UE tries and successfully connects (S10=YES), then the process ends. However, if the UE tries and fails to connect to the selected PLMNID (S10=NO), the UE, in step S11, shall remove such PLMNID from {PLMNi} and {PLMNn} sets and go back to step S3 to perform a PLMN selection for simultaneous access with the modified set of PLMNIDs.

In one embodiment, {PLMNn} may additionally include PLMNIDs that have an entry in the PLMN list stored in the SIM/USIM for already connected access technology types for which PLMN re-selection are allowed while connected. Also, {PLMNn} may include PLMNIDs that have an entry in the PLMN list stored in the SIM/USIM for currently not connected access technology types for which PLMN selection for simultaneous access is allowed.

The access technology types may include currently connected access technology types for which PLMN re-selection is allowed. Further, currently not connected access technology types shall be taken into account in the PLMN selection for simultaneous access.

In one embodiment, operator policies 1 can be as follows. In operator policy 1, PLMN re-selection on an access technology type cannot be triggered as a result of PLMN selection on a different access technology type. In operator policy 2, only connected access technology types are taken into account in PLMN selection for simultaneous access. In this embodiment, the UE can select from access technology types that already connected.

Some use cases, in accordance with this embodiment, are presented and shown in FIG. 5. These use cases cannot be supported without this invention. For example, when the terminal is connected through a 3GPP access to PLMN1 and through a WLAN access to PLMN2, the operator of PLMN1 cannot request or require the UE to offload traffic to WLAN, as it would be offloading traffic to a different operator. However, if the inventive method were used, and the terminal or UE were capable of connecting to PLMN1 through WLAN access, the operator of PLMN1 would be able to offload traffic to WLAN.

Use Cases 1.1-1.4 shown in FIG. 5 illustrate UE having PLMN preferred list for 3GPP accesses as shown. UE is at a location where it does not have coverage for access technology type 1 (A1) from PLMN1 but it has coverage from PLMN3; therefore UE selects PLMN3 for A1 coverage. For A2 in the PLMN preferred list, PLMN1 has preference over PLMN3. UE is at a location where it has coverage for A2 from PLMN1 and from PLMN3 so the UE selects PLMN1 for A2 access. Neither visited PLMN1 nor visited PLMN2 can control traffic flow steering as the UE is connected to two different PLMNs.

In particular, in Use Case 1.1 there is no overlap between A1 and A2. UE is registered in PLMN3 through A3. Accordingly, using standard procedures such as priority information, since PLMN1 is the highest priority for A1, A1 is selected.

In Use Case 1.2, it is assumed that PLMN2 was not available when the UE originally connected with A2, but PLMN2 is now available. Hence there is overlap between A1 and A2 but UE is currently registered with PLMN3. In this case, UE continues with PLMN3 and adds PLMN1, maintaining stability and not forcing a change in PLMN. Instead, as shown in this use case, the number of changes is minimized.

In Use Case 1.3, there is overlap between A1 and A2 and UE is registered to PLMN1. Thus the intersection of PLMNi and PLMNn is PLMN1 which is selected. This is known as the "well behaved" case.

In Use Case 1.4, the UE is connected to two PLMNs, PLMN1 through A2 and PLMN2 through A3. Here, PLMN2 is selected because it provides access to a larger number of access technologies.

In another embodiment, operator policies 1 can be as follows. In operator policy 1, PLMN re-selection on an access technology type can always be triggered as a result of PLMN selection on a different access technology type. In operation policy 2, only connected access technology types are taken into account in PLMN selection for simultaneous access. In this embodiment, {PLMNn} additionally contains PLMNIDs that have an entry in the PLMN list stored in the SIM/USIM for already connected access technology types. Further, the UE can select from access technology types that already connected.

Use Cases 2.1-2.4, shown in FIG. 6, illustrate the operator policies of this embodiment. In Use Case 2.1, {PLMNn} contains both PLMN3 and PLMN5. UE is registered in PLMN3 through A3. However, there is no overlap between PLMNi and PLMNn so, using standard procedures, A1 connects to PLMN1 which has the highest priority for A1.

In Use Case 2.2, the overlap of PLMNi and PLMNn is PLMN2, so that the UE selects PLMN2. In this case, UE is registered in PLMN3 through A2 but to maintain stability, PLMN3 is not dropped when PLMN2 is added.

In Use Case 2.3, the overlap of PLMNi and PLMNn is both PLMN1 and PLMN2. UE selects PLMN1 because it has the highest priority and UE is already registered in PLMN1.

In Use Case 2.4, the overlap of PLMNi and PLMNn is also both PLMN1 and PLMN2. In this case, however, UE selects PLMN2 because it provides access to a larger number of access technologies.

In yet another embodiment, operator policies can be as follows. In operator policy 1, PLMN re-selection on an access technology type can always be triggered as a result of PLMN selection on a different access technology type. In operator policy 2, a specific subset of non connected access technology types is taken into account for PLMN selection for simultaneous access. {PLMNn} additionally contains PLMNIDs that have an entry in the PLMN list stored in the SIM/USIM for already connected access technology types. Further, the access technology types are those already connected and those considered as part of operator policy 2.

The inventive technology advantageously enables accounting and charging to be simplified. If the UE is connected to a single PLMN and mobility between accesses is allowed, accounting is much simpler than when the UE is connected to multiple PLMNs.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for network selection procedures for simultaneous network connectivity through multiple accesses, comprising steps of:
   obtaining, on a user equipment having a CPU, stored public land mobile networks (PLMNs) and registered PLMNs;
   determining whether one or more PLMNs are both a stored PLMN for access technology type Ai and a registered PLMN;
   when no PLMNs are both, performing PLMN selection for Ai using a standard procedure;
   when only one PLMN is both, perfoiining steps of:
      determining whether the one PLMN satisfies a condition;
      when the one PLMN satisfies the condition, attempting to connect to the one PLMN; and
   when more than one PLMN is both, performing steps of:
      creating a set of the more than one PLMN;
      selecting one PLMN of the set of PLMNs, said selected one PLMN satisfying the condition;
      attempting to connect to the selected one PLMN; and
      when attempting to connect fails, removing the selected one PLMN from the set, and selecting another PLMN from the set;
   wherein the step of selecting further comprises selecting the PLMN that minimizes changes wherein the stored PLMNs are stored on one of a Subscriber Identity Module (SIM) and a USIM.

2. The method according to claim 1 wherein the stored PLMNs are stored on one of a Subscriber Identity Module (SIM) and a USIM.

3. The method according to claim 1, wherein the step of selecting further comprises selecting the PLMN that provides access to a larger number of access technologies.

4. A non-transitory computer readable storage medium storing a program of instructions executable by a machine to perform a method for network selection procedures for simultaneous network connectivity through multiple accesses, comprising:
   obtaining stored public land mobile networks (PLMNs) and registered PLMNs;
   determining whether one or more PLMNs are both a stored PLMN for access technology type Ai and a registered PLMN;
   when no PLMNs are both, performing PLMN selection for Ai using a standard procedure;
   when only one PLMN is both, performing steps of:
      determining whether the one PLMN satisfies a condition;
      when the one PLMN satisfies the condition, attempting to connect to the one PLMN; and
   when more than one PLMN is both, performing steps of:
      creating a set of the more than one PLMN:
      selecting one PLMN of the set of PLMN, said selected one PLMN satisfying the condition;
      attempting to connect to the selected one PLMN; and
      when attempting to connect fails, removing the selected one PLMN from the set,
   and selecting another PLMN from the set
   wherein selecting further comprises selecting the PLMN that minimizes changes.

5. The non-transitory computer readable storage medium according to claim 4, wherein the stored PLMNs are stored on one of a Subscriber Identity Module (SIM) and a USIM.

6. The non-transitory computer readable storage medium according to claim 4, wherein selecting further comprises selecting the PLMN that provides access to a larger number of access technologies.

7. A system for network selection procedures for simultaneous network connectivity through multiple accesses, comprising:
  a User Equipment (UE) having a Subscriber Identity Module having a public land mobile networks (PLMN) selection list, said UE registered to one or more PLMNs; and
  a module operable to obtain stored PLMNs and registered PLMNs, to determine whether one or more PLMNs are both a stored PLMN for access technology type Ai and a registered PLMN, when no PLMNs are both, to perform PLMN selection for Ai using a standard procedure, when only one PLMN is both, to determine whether the one PLMN satisfies a condition, and when the one PLMN satisfies the condition, to attempt to connect to the one PLMN, and when more than one PLMN is both, to create a set of the more than one PLMN, to select one PLMN of the set of PLMNs, said selected one PLMN satisfying the condition, to attempt to connect to the selected one PLMN, and when attempting to connect fails, to remove the selected one PLMN from the set, and select another PLMN from the set;
  wherein to select one PLMN of the set of PLMN further comprises selecting the PLMN, that minimizes changes.

8. The system according to claim 7, wherein to select one PLMN of the set of PLMN farther comprises selecting the PLMN that provides access to a larger number of access technologies.

* * * * *

UNITED STATES PATENT AND TRADEMARK OFFICE
CERTIFICATE OF CORRECTION

PATENT NO. : 8,611,280 B2  Page 1 of 1
APPLICATION NO. : 13/005764
DATED : December 17, 2013
INVENTOR(S) : Morera et al.

It is certified that error appears in the above-identified patent and that said Letters Patent is hereby corrected as shown below:

In the Drawings

Figure 1:
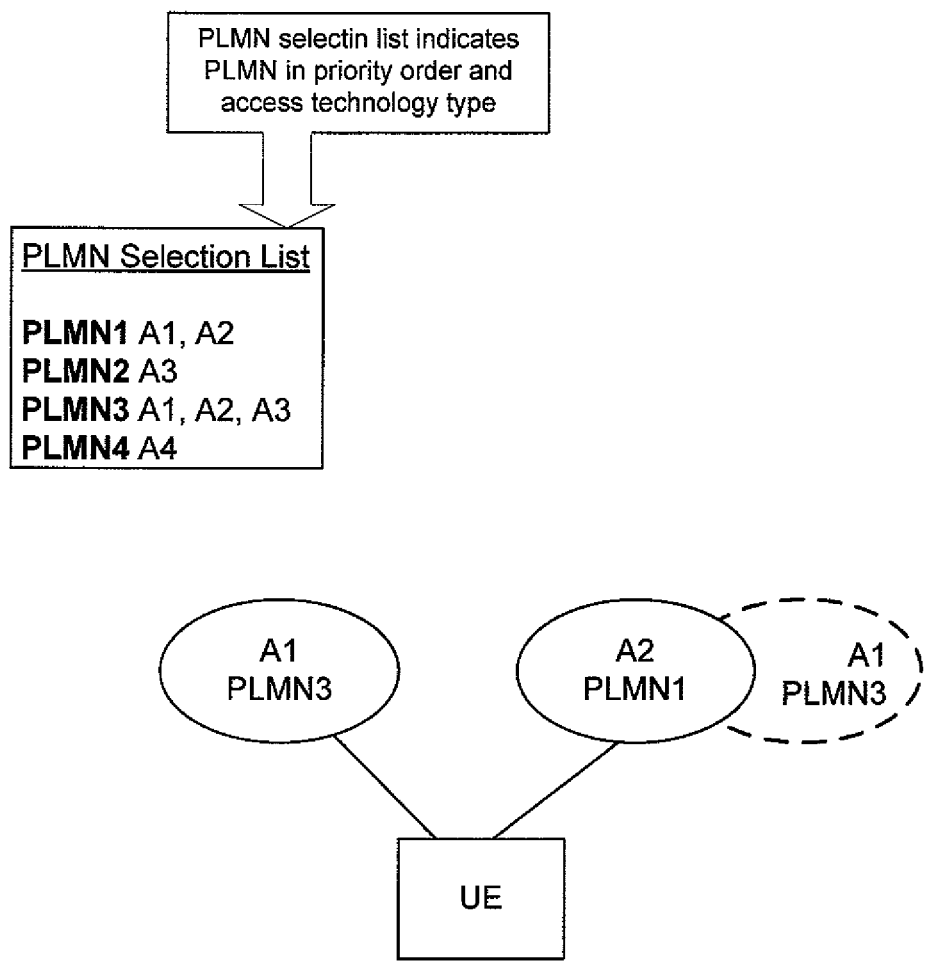
FIG. 1 shows a UE connected to multiple access networks of different technology types using current standards.
Figure 2:
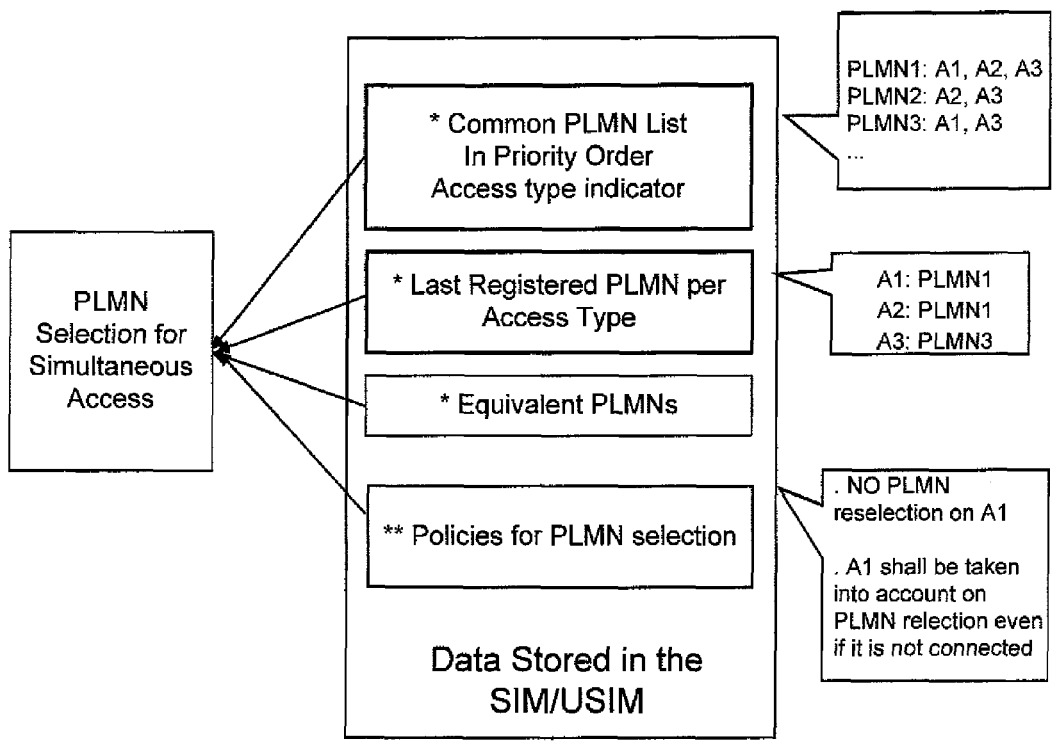
FIG. 2 illustrates information available to PLMN Selection Mechanism.

In Fig. 2, Sheet 2 of 6, delete "relection" and insert -- selection --, therefor.

In Fig. 3, Sheet 3 of 6, Line 28, delete "PLMNIDs" and insert -- PLMNIDs. --, therefor.

In Fig. 6, Sheet 6 of 6, delete "Use Case 1.4" and insert -- Use Case 2.4 --, therefor.

In the Claims

In Column 8, Line 15, in Claim 1, delete "perfoiining" and insert -- performing --, therefor.

In Column 8, Line 32, in Claim 2, delete "claim 1 wherein" and insert -- claim 1, wherein --, therefor.

In Column 8, Line 56, in Claim 4, delete "PLMN:" and insert -- PLMN; --, therefor.

In Column 8, Line 62, in Claim 4, delete "set" and insert -- set, --, therefor.

In Column 9, Line 29, in Claim 8, delete "farther" and insert -- further --, therefor.

Signed and Sealed this
Thirty-first Day of March, 2015

Michelle K. Lee
*Director of the United States Patent and Trademark Office*